US00RE44905E

(19) United States
(12) Reissued Patent
Tseng et al.

(10) Patent Number: US RE44,905 E
(45) Date of Reissued Patent: May 20, 2014

(54) USER CREATED TAGS FOR ONLINE SOCIAL NETWORKING

(75) Inventors: Greg Tseng, San Francisco, CA (US); Johann Schleier-Smith, San Francisco, CA (US)

(73) Assignee: Tagged, Inc., San Francisco, CA (US)

(21) Appl. No.: 13/549,105

(22) Filed: Jul. 13, 2012

Related U.S. Patent Documents

Reissue of:
(64) Patent No.: 7,756,926
Issued: Jul. 13, 2010
Appl. No.: 12/422,155
Filed: Apr. 10, 2009

U.S. Applications:
(63) Continuation of application No. 11/829,719, filed on Jul. 27, 2007, now Pat. No. 7,529,797.

(60) Provisional application No. 60/838,459, filed on Aug. 16, 2006.

(51) Int. Cl.
*G06F 15/16* (2006.01)

(52) U.S. Cl.
USPC ..... 709/204; 709/201; 709/206; 709/217; 709/218; 709/219; 709/223; 709/226

(58) Field of Classification Search
USPC ..... 709/201, 204, 205, 217, 218, 219, 223, 709/226
See application file for complete search history.

(56) References Cited

U.S. PATENT DOCUMENTS 6,112,181 A 8/2000 Shear et al.
6,149,441 A * 11/2000 Pellegrino et al. ..... 434/350
6,285,999 B1 9/2001 Page
6,306,033 B1 * 10/2001 Niwa et al. ..... 463/1
6,381,635 B1 4/2002 Hoyer et al.
6,963,874 B2 11/2005 Kasriel et al.

(Continued)

FOREIGN PATENT DOCUMENTS

EP 1574979 9/2005
EP 1574979 A1 9/2005

(Continued)

OTHER PUBLICATIONS

International Search Report PCT/US07/17051 Dated May 27, 2008; pp. 1-2.

(Continued)

*Primary Examiner* — Liangche A Wang
(74) *Attorney, Agent, or Firm* — Perkins Coie LLP

(57) ABSTRACT

The present invention provides a social networking system and method by which customized tags can be created by a registered user in an online social networking environment and distributed to facilitate social networking. The tags represent personal characteristics and preferences associated with users of the online social networking environment. A graphical user interface (GUI) is provided in the online social networking website that enables a specific user to create and customize tags. Tags can be embeddable in that a user can insert the tag in a website GUI for display. Also, tags may have embedded content, e.g. a photo, a song, a profile page location, etc and may be sponsored or traded in the social networking website. Also a skin that shows the personal profile page GUI style may be customized, sponsored, or traded.

34 Claims, 10 Drawing Sheets

(56) References Cited

U.S. PATENT DOCUMENTS

| | | | | |
|---|---|---|---|---|
| 7,069,308 | B2 * | 6/2006 | Abrams | 709/218 |
| 7,117,254 | B2 | 10/2006 | Lunt et al. | |
| 7,149,977 | B2 * | 12/2006 | Zaner et al. | 715/753 |
| 7,234,117 | B2 | 6/2007 | Zaner et al. | |
| 7,249,123 | B2 * | 7/2007 | Elder et al. | 1/1 |
| 7,269,590 | B2 * | 9/2007 | Hull et al. | 707/770 |
| 7,359,894 | B1 * | 4/2008 | Liebman et al. | 1/1 |
| 7,366,759 | B2 * | 4/2008 | Trevithick et al. | 709/206 |
| 7,373,606 | B2 * | 5/2008 | Gorzela | 715/738 |
| 7,433,876 | B2 | 10/2008 | Spivack et al. | |
| 7,529,797 | B2 | 5/2009 | Tseng | |
| 7,756,926 | B2 | 7/2010 | Tseng | |
| 7,761,385 | B2 | 7/2010 | Hutchison et al. | |
| 7,761,386 | B2 | 7/2010 | Teicher | |
| 7,769,699 | B2 | 8/2010 | Teicher | |
| 7,974,868 | B2 | 7/2011 | Tseng et al. | |
| 2001/0020231 | A1 | 9/2001 | Perri et al. | |
| 2002/0042733 | A1 | 4/2002 | Lesandrini et al. | |
| 2002/0103698 | A1 | 8/2002 | Cantrell | |
| 2003/0115333 | A1 | 6/2003 | Cohen et al. | |
| 2003/0208578 | A1 | 11/2003 | Taraborelli et al. | |
| 2004/0003038 | A1 * | 1/2004 | Huang et al. | 709/204 |
| 2004/0093266 | A1 * | 5/2004 | Dohring | 705/14 |
| 2005/0021750 | A1 | 1/2005 | Abrams | |
| 2005/0160001 | A1 | 7/2005 | Lapre et al. | |
| 2005/0216338 | A1 | 9/2005 | Tseng et al. | |
| 2005/0235062 | A1 | 10/2005 | Lunt et al. | |
| 2006/0121990 | A1 | 6/2006 | O'Kelley et al. | |
| 2006/0242554 | A1 * | 10/2006 | Gerace et al. | 715/501.1 |
| 2006/0282328 | A1 * | 12/2006 | Gerace et al. | 705/14 |
| 2006/0287920 | A1 | 12/2006 | Perkins et al. | |
| 2007/0100686 | A1 | 5/2007 | Murakami et al. | |
| 2007/0282877 | A1 * | 12/2007 | Fischer et al. | 707/101 |
| 2008/0046458 | A1 | 2/2008 | Tseng et al. | |
| 2008/0052203 | A1 | 2/2008 | Beyer et al. | |
| 2008/0098087 | A1 | 4/2008 | Lubeck | |
| 2008/0098313 | A1 | 4/2008 | Pollack | |
| 2008/0140650 | A1 | 6/2008 | Stackpole | |
| 2009/0192861 | A1 | 7/2009 | Suzuki et al. | |
| 2009/0241035 | A1 | 9/2009 | Tseng et al. | |
| 2010/0088246 | A1 | 4/2010 | Lim | |
| 2010/0198836 | A1 | 8/2010 | Glass et al. | |
| 2010/0241580 | A1 | 9/2010 | Schleier-Smith | |
| 2011/0178851 | A1 | 7/2011 | Tseng et al. | |
| 2011/0225102 | A1 | 9/2011 | Schleier-Smith | |

FOREIGN PATENT DOCUMENTS

| | | | |
|---|---|---|---|
| EP | 2270731 | | 1/2011 |
| EP | 2270731 | A1 | 1/2011 |
| JP | 2000066970 | A | 3/2000 |
| JP | 2005259074 | A | 9/2005 |
| JP | 2007328723 | A | 12/2007 |
| KR | 100643480 | B1 | 11/2006 |
| WO | WO-2008020992 | A2 | 2/2008 |
| WO | WO-2010107566 | A2 | 9/2010 |

OTHER PUBLICATIONS

Bannan, Karen J., "Its Catching"; V41n23; pp. IQ20-IQ26, Jun. 5, 2000; Dialog File 15.

Non-Final Office Action mailed Nov. 16, 2009 in U.S Appl. No. 11/000,707, filed Nov. 30, 2004.

Final Office Action mated Aug. 22, 2008 for Issued Patent No. 7,529,797, U.S. Appl. No. 11/829,719 by Tseng, G., et al., filed Jul. 27, 2007.

Notice of Allowance mailed Apr. 8, 2010 for Issued Patent No. 7,756,926, U.S. Appl. No. 12/422,155 by Tseng, G., et al., filed Apr. 10, 2009.

Final Office Action mailed Jul. 21, 2011, for U.S. Appl. No. 12/407,746 by Schleier-Smith. J. M., filed Mar. 19, 2009.

Bannan, Karen J., "Its Catching"; V41n23; pp. IQ20-1Q26, Jun. 5, 2000; Dialog File 15.

Dunn, Dan T., Jr.; Probstein, Sidney C., Marketing High Tech Services, Review of Business v24n1; pp. 1-7, Winter 2003; Dialog file 15.

International Search Report PCT/US2007/17051 dated May 27, 2008, pp. 1-2.

Written Opinion PCT/US2007/17051 dated May 27, 2008, pp. 1-5.

International Search Report PCT/US2010/025461 dated Sep. 28, 2010, pp. 1-3.

Written Opinion PCT/US2010/025461 dated Sep. 28, 2010, pp. 1-6.

Co-pending U.S. Appl. No. 12/407,746 by Schleier-Smith, J. M., filed Mar. 19. 2009.

Co-pending U.S. Appl. No. 13/026,970 by Tseng, G., et al., filed Feb. 14, 2011.

Co-pending U.S. Appl. No. 13/109,931 by Schleier-Smith, J. M., filed May 17, 2011.

Restriction Requirement mailed Jun. 23, 2009 in U.S. Appl. No. 11/000,707 by Tseng, G., et al., filed Nov. 30, 2004.

Final Office Action mailed Apr. 2, 2010 in U.S. Appl. No. 11/000,707 by Tseng, G., et al., filed Nov. 30, 2004.

Non-Final Office Action mailed Jul. 23, 2010 in U.S Appl. No. 11/000,707 by Tseng, G., et al., filed Nov. 30, 2004.

Final Office Action mailed Feb. 3, 2011 in U.S. Appl. No. 11/000,707 by Tseng, G., et al., filed Nov. 30, 2004.

Notice of Allowance mailed Mar. 4, 2011 in U.S. Appl. No. 11/000,707 by Tseng, G., et al., filed Nov. 30, 2004.

Non-Final Office Action mailed Feb. 17, 2012, for U.S. Appl. No. 13/026,970 by Tseng, G., et al., filed Feb. 14, 2011.

Final Office Action mailed Dec. 14, 2012, for U.S. Appl. No. 13/026,970 by Tseng, G., et al., filed Feb. 14, 2011.

Non-Final Office Action mailed May 21, 2008 for Issued Patent No. 7,529,797, U.S. Appl. No. 11/829,719 by Tseng, G., et al., filed Jul. 27, 2007.

Non-Final Office Action mailed Dec. 31, 2008 for Issued Patent No. 7,529,797, U.S. Appl. No. 11/829,719 by Tseng, G., et al., filed Jul. 27, 2007.

Notice of Allowance mailed Mar. 6, 2009 for Issued Patent No. 7,529,797, U.S. Appl. No. 11/829,719 by Tseng, G., et al., filed Jul. 27, 2007.

Restriction Requirement mailed Dec. 9, 2010 for U.S. Appl. No. 12/407,746 by Schleier-Smith, J. M., filed Mar. 19, 2009.

Non-Final Office Action mailed Feb. 4, 2011 for U.S. Appl. No. 12/407,746 by Schleier-Smith, J. M., filed Mar. 19, 2009.

Restriction Requirement mailed Jan. 10, 2013, for U.S. Appl. No. 13/109,931 by Schleier-Smith, J. M., filed Mar. 19, 2009.

Non-Final Office Action mailed Jun. 6, 2013, for U.S. Appl. No. 13/109,931 by Schleier-Smith, J. M., filed Mar. 19, 2009.

Examiner's Report dated Sep. 25, 2012, for Australian Patent Application No. 2010226195 filed Feb. 25, 2010, 4 pp.

Office Action dated Jan. 20, 2012, for Canadian Patent Application No. 2,660,825 filed Jul. 30, 2005, 3 pp.

European Search Report European Publication No. EP 1574979 A1 dated Jun. 7, 2005, 1 page.

European Search Report European Publication No. EP 2270731 A1 dated Nov. 23, 2010, 1 page.

Office Action dated Mar. 8, 2013 for Japanese Patent Application No. 2012-500817 filed Feb. 25, 2010, 4 pp., with English translation 5 pp.

Office Action dated Mar. 6, 2013 for Korean Patent Application No. 10-2011-7023714 filed Feb. 25, 2010, 24 pp., with English translation 6 pp.

Final Office Action mailed Dec. 3, 2013, for U.S. Appl. No. 13/109,931 by Schleier-Smith, J. M., filed Mar. 19, 2009.

* cited by examiner

USER CREATED TAGS FOR ONLINE SOCIAL NETWORKING

Matter enclosed in heavy brackets [ ] appears in the original patent but forms no part of this reissue specification; matter printed in italics indicates the additions made by reissue.

*CROSS-REFERENCE TO* RELATED APPLICATIONS

This *patent application is a reissue application for commonly assigned U.S. Pat. No. 7,756,926, issued from U.S. patent application Ser. No. 12/422,155, filed on Apr. 10, 2009, which* application is a continuation of U.S. application Ser. No. 11/829,719, filed Jul. 27, 2007 *now U.S. Pat. No. 7,529,979*, entitled "User Created Tags for Online Social Networking" by Greg Tseng and Johann Schleier-Smith, which claims priority to U.S. Provisional Application Ser. No. 60/838,459, filed Aug. 16, 2006, entitled "User Created Tags For Online Social Networking" by Greg Tseng and Johann Schleier-Smith, both of which are incorporated by reference in their entireties.

FIELD

The present invention relates to online social networking, and facilitates online social networking via tagging schemes and tags that represent personal characteristics and preferences.

BACKGROUND

The Internet has spawned a host of busy social networking platforms. The typical online social networking website graphic user interface (GUI) lacked the sophistication to convey personal characteristics in a movable fashion. The typical social networking website GUI has a personal profile page with personal information and interests of a user, and is used to browse the social network member's information and contacts. Another user can initiate communication by leaving messages or comments.

SUMMARY

The invention includes a social networking method for creating customized tags. The method provides an online social networking environment that supports tags representing personal characteristics and preferences associated with users of the online social networking environment. A user can open a GUI that enables the user to create and customize tags.

An embodiment of the present invention teaches an Internet website user interface that allows a registered user to choose between predefined tags or create customized tags. Once a user chooses to create customized tags, the application allows a user to select a name and create a graphic icon by uploading, linking to a URL, using a template, or drawing. After the tag is created, the user can store the tag data.

A tag can be embeddable in that a user can insert the embeddable tag in a website GUI for display, including other social networking websites. Also, a user can embed in tags desired contents, e.g. a photo, a song, a location (profile page), a shout-out, an expression of feeling, tags, presents, etc. The recipient can click the embedded tags to see the photo, play the song, go to the profile page, or chat, etc.

To facilitate advertising in an online social networking environment and provide sponsorship of the online social networking, sponsored tags may be used by users or sponsors of a social network website. Sponsored tags represent a product, a brand, a trademark, or a generic icon of a sponsor.

To facilitate the management of the online social network, a buddy list or tag team list as well as external distribution list may be used for the purpose of socialization, contact, or distribution of tags.

A user of the online social network may use a tag Container that conveniently stores and displays the user's tags, which are created, selected, or received by the user. Tag trading statistics of each user may be stored for history tracking.

To provide a customized profile page of a user in the online social networking website, a customized skin that shows personal style of the profile page may be also created, sponsored or traded in the social networking environment.

BRIEF DESCRIPTION OF THE DRAWINGS

Non-limiting and non-exhaustive embodiments of the present invention are described with reference to the following drawings, in which.

DETAILED DESCRIPTION OF THE INVENTION

Figure 1:
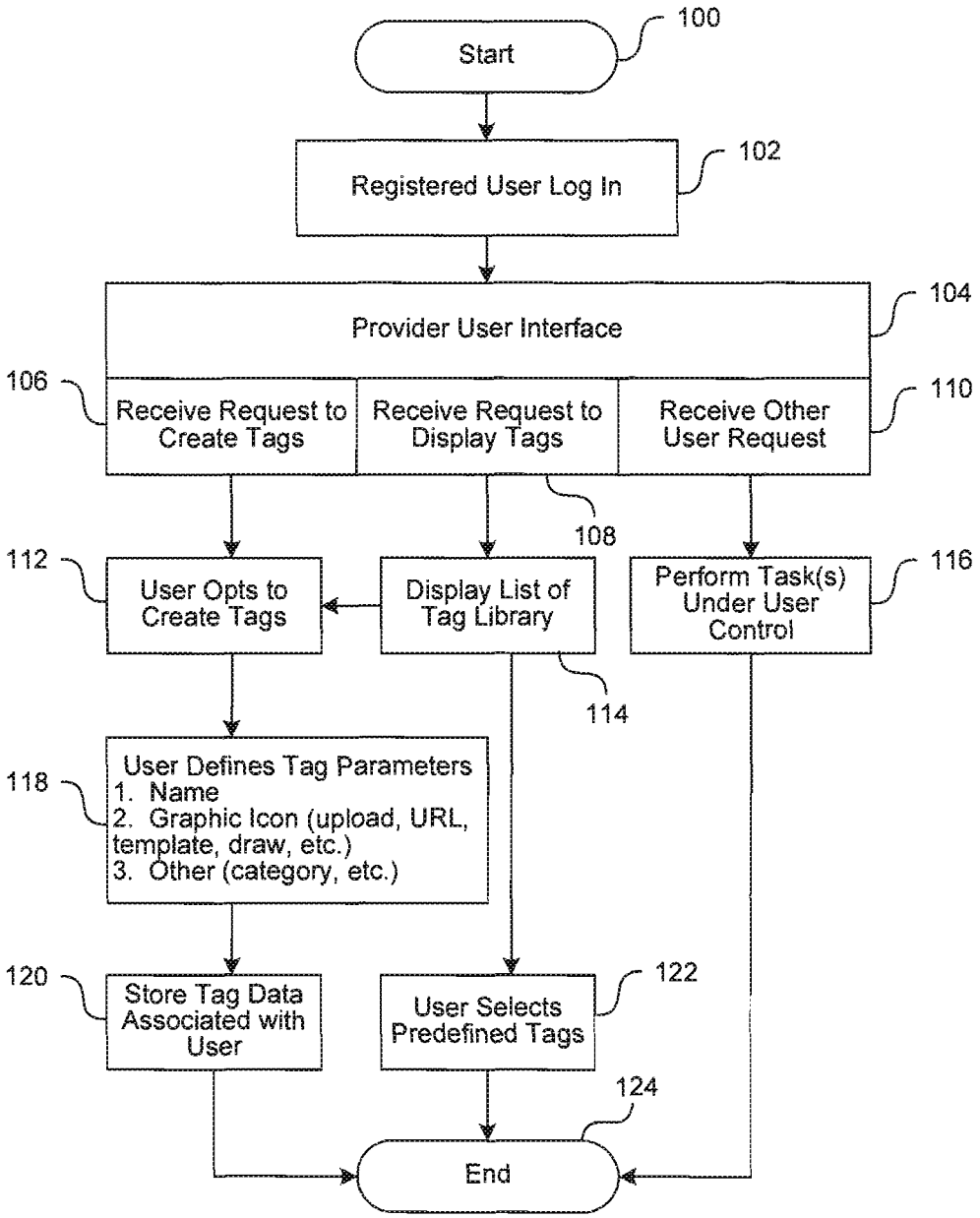
FIG. 1 is a representative method flowchart featuring the steps of creating user defined tags.

An invention is disclosed for a system and method for creating customized tags that represent personal characteristics and preferences, by users of a social network website, to facilitate online social networking. In the following description, numerous specific details are set forth in order to provide a thorough understanding of the present invention. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Briefly stated, an embodiment of the invention is related to a social networking system and method by which customized tags can be created by a registered user in an online social networking environment and distributed to facilitate social networking. The tags represent personal characteristics and preferences associated with users of the online social networking environment. By utilizing a computer or graphic user interface (GUI) that enables a specific user to create and customize tags, the user can create a specific tag according to instructions from the specific user and make the specific tag available for use by the specific user. The steps of allowing the user to create the customized tags may include defining the tag parameters, e.g. a name, a graphic icon, and a category, etc.

The website www.tagged.com provides an interactive social experience for teens. It's a place to meet new people, let people know what a person is all about, and make new friends. Once a person registers, he can fill out his profile and invite all of his friends to join his tag Team. The user can continue to add people to his team, see who's in other people's tag teams, and check out other people's profiles by clicking on their names.

Tags represent who the user is. For example, if the user is a great athlete, she can select a Sports tag, or if a dancer or a writer, select the Arts tag. A user can give her friends tags (like "Best Friend," etc.) to let them know what she thinks about them. If the user wants to nudge his friends to give him tags, he can ask them by going to his tag Team page and clicking the hand icon next to each person on his team to ask for tags.

Tags can be created by the user via the provider's user interface by defining various tag parameters, e.g. name, graphic icon, etc. This invention discloses a system and method for creating customized tags that represents personal characteristics and preferences, by users of a social network website, to facilitate online social networking, as well as advertisement method in the online social networking environment by using sponsored tags.

Tags can be embeddable in that they could be inserted in a website GUI for display by a user. Also, tags may have embedded contents, e.g. a photo, a song, a location of a profile page, a shout out, an expression of feelings, tags, or presents. Also, tags can be traded or sponsored in the social networking environment by users of the social network, the creators of tags, and sponsors.

FIG. 1 is a representative method flowchart featuring the steps of creating user defined tags. A registered user of an online social network can Log In 102, and choose one of the options available from the online social networking provider's GUI 104. In one embodiment, the user can request to create tags 106, or request to display predefined tags 108, or request other tasks 110. After the user opts to create customized tags 112, a provider GUI enables the user to create customized tags by defining the tag parameters 118, e.g. a name, a graphic icon, a category, etc. Once the customized tags are defined, the tag data can be stored and associated with the creator (user) 120 for future use. If the user instead chooses to display the list of tag library 114, the provider GUI shows predefined tags for the user to browse. The user can select tags among the predefined tags displayed 122, or opt to create customized tags 112 if he does not want to use the predefined tags. If the user has chosen to request other tasks 110 from the provider GUI 104, he can perform the tasks 116 and end the session 124.

Figure 2:
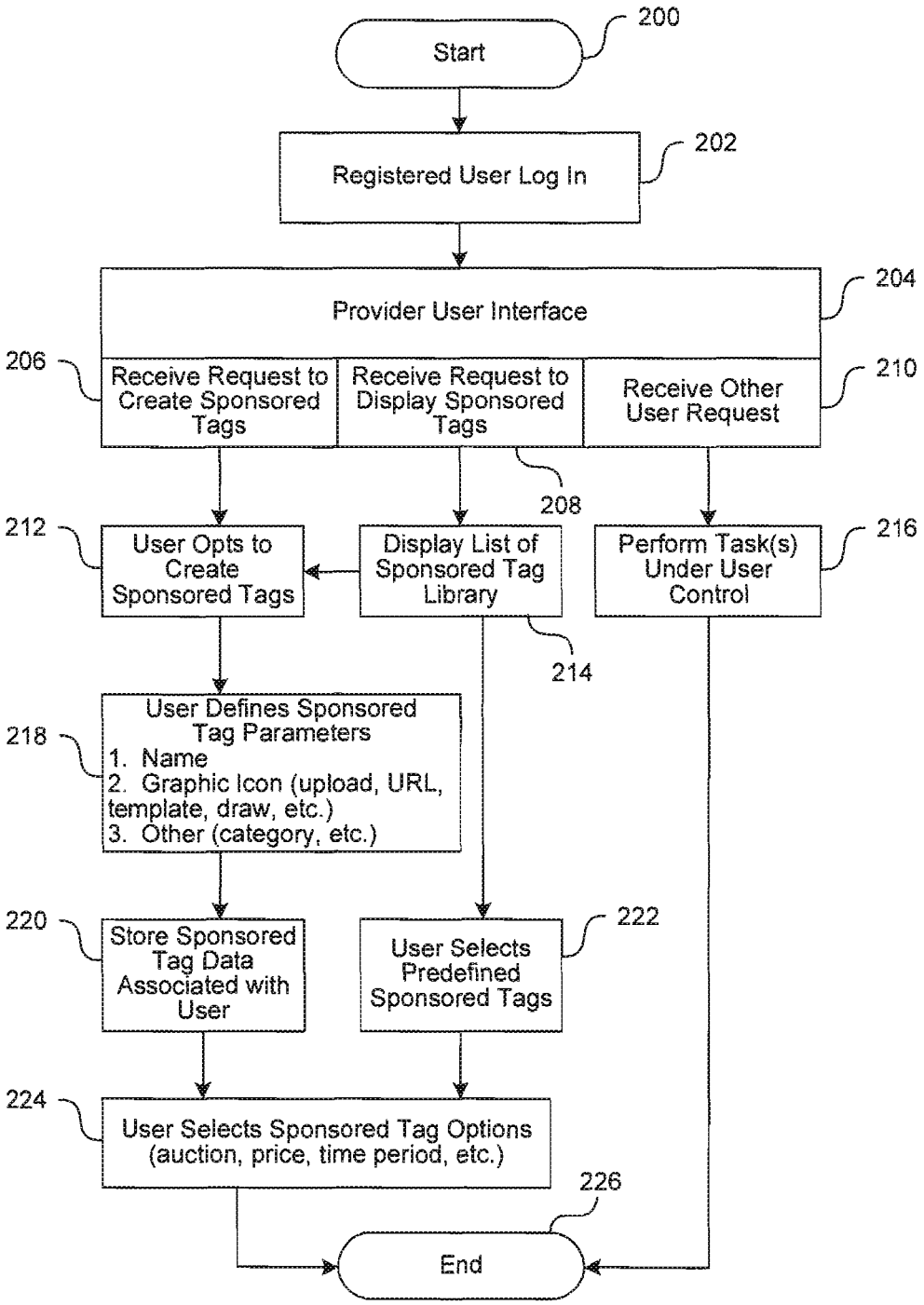
FIG. 2 is a representative method flowchart featuring the steps of creating sponsored tags.

FIG. 2 is a representative method flowchart featuring the steps of creating sponsored tags. A registered user of an online social network can Log In 202, and choose one of the options available from the online social networking provider's GUI 204. In one embodiment, the user can request to create customized sponsored tags 206, or request to display predefined sponsored tags 208, or request other tasks 210. After the user opts to create customized sponsored tags 212, a provider GUI enables the user to create sponsored tag by defining the tag parameters 218, e.g. a name, a graphic icon, a category, etc. Once the sponsored tags are defined, the sponsored tag data can be stored and associated with the creator (user) 220 for future use. After the tag data is stored, the user can select sponsored tag options, e.g. auction, price, time period, etc 224. If the user instead chooses to display the list of sponsored tag library 214, the provider GUI shows predefined sponsored tags for the user to browse. The user can select sponsored tags among the predefined sponsored tags displayed 222, or opt to create customized sponsored tags 212 if he does not want to use the predefined sponsored tags. If the user select predefined sponsored tags 222, he can select the sponsored tag options, e.g. auction, price, time period, etc. 224. If the user has chosen to request other tasks 210 from the provider GUI 204, he can perform the tasks 216 and end the session 226.

Figure 3:
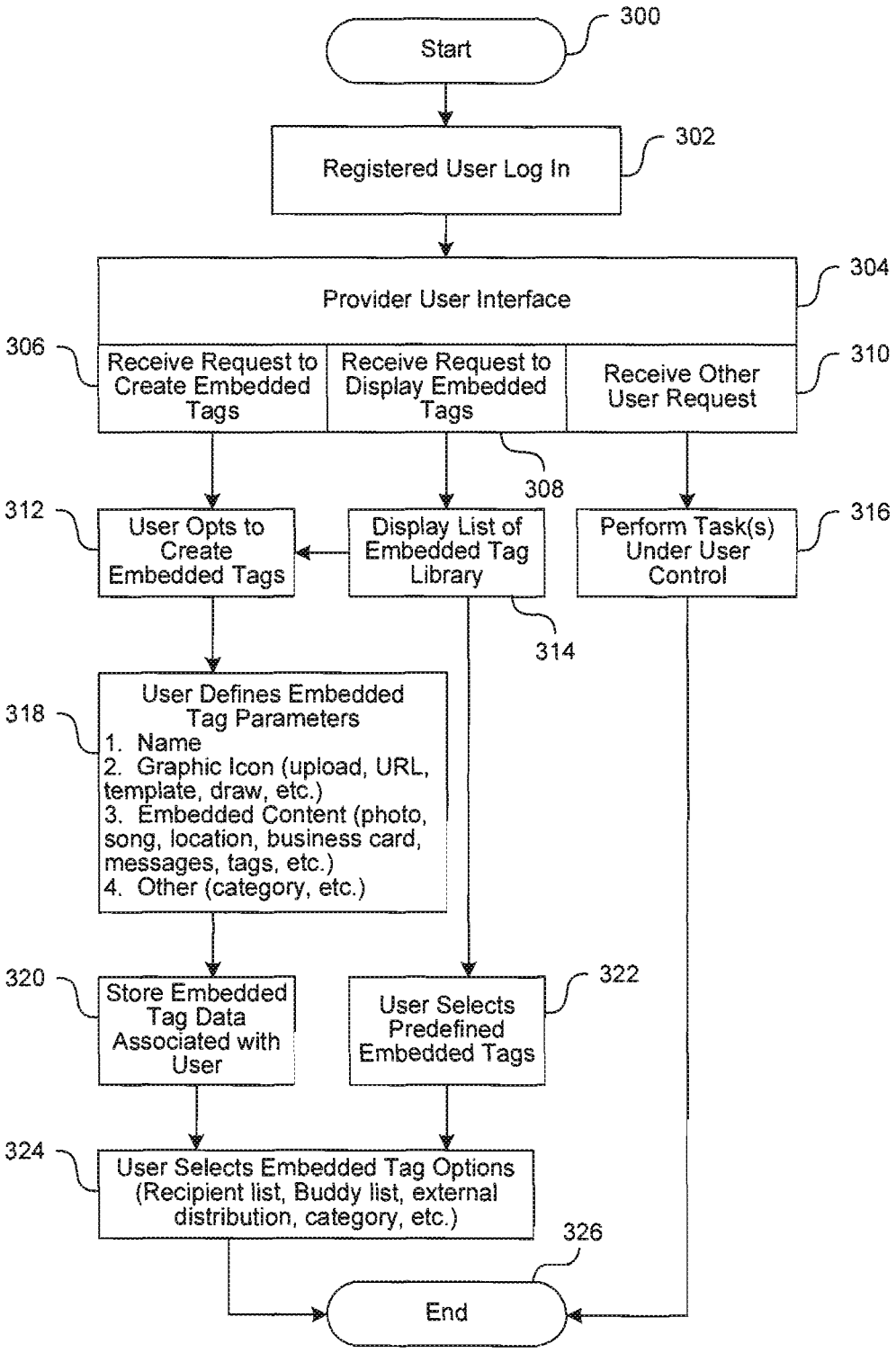
FIG. 3 is a representative method flowchart featuring the steps of creating embedded tags.

FIG. 3 is a representative method flowchart featuring the steps of creating embedded tags. A registered user of an online social network can Log In 302, and choose one of the options available from the online social networking provider's GUI 304. In one embodiment, the user can request to create embedded tags 306, or request to display predefined embedded tags 308, or request other tasks 310. After the user opts to create customized embedded tags 312, a provider GUI enables the user to create customized embedded tags by defining the tag parameters 318, e.g. a name, a graphic icon, embedded content, a category, etc. Once the customized embedded tags are defined, the tag data can be associated with the creator (user) 320 for future use. After the tag data is stored, the user can select embedded tag options, e.g. recipient list, buddy list, external distribution, a category, etc 324. If the user instead chooses to display the list of embedded tag library 314, the provider GUI shows predefined embedded tags for the user to browse. The user can select embedded tags among the predefined embedded tags displayed 322, or opt to create customized embedded tags 312 if he does not want to use the predefined tags. If the user select predefined embedded tags 322, he can select the embedded tag options, e.g. recipient list, buddy list, external distribution, a category, etc 324. If the user has chosen to request other tasks 310 from the provider GUI 304, he can perform the tasks 316 and end the session 324.

Figure 4:
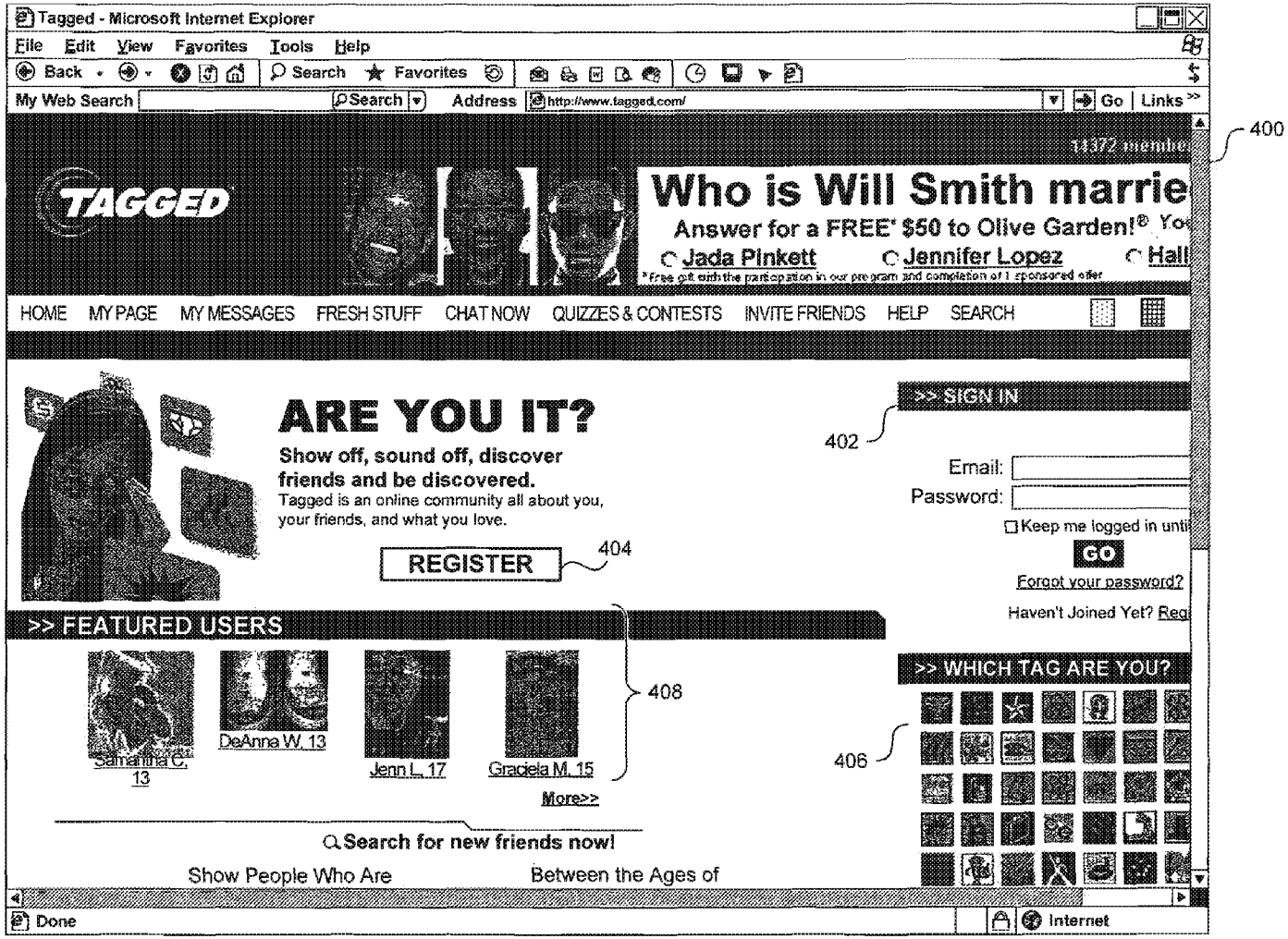
FIG. 4 is a representative graphic user interface (GUI) that allows a registered user to log in or a new user to register in the social networking website.

FIG. 4 illustrates a representative provider GUI 400 of the online social networking website that allows a registered user to Sign In (or Log In) 402 or a new user to register 404 in the social networking website. Also it shows sample tags that are available on the website 406. In one embodiment, a registered user can type in the email address and password in the Sign In box 402 to log in. The GUI 400 also shows Featured Users 408 with a photo and user name with age, to facilitate social networking with them.

Figure 5:
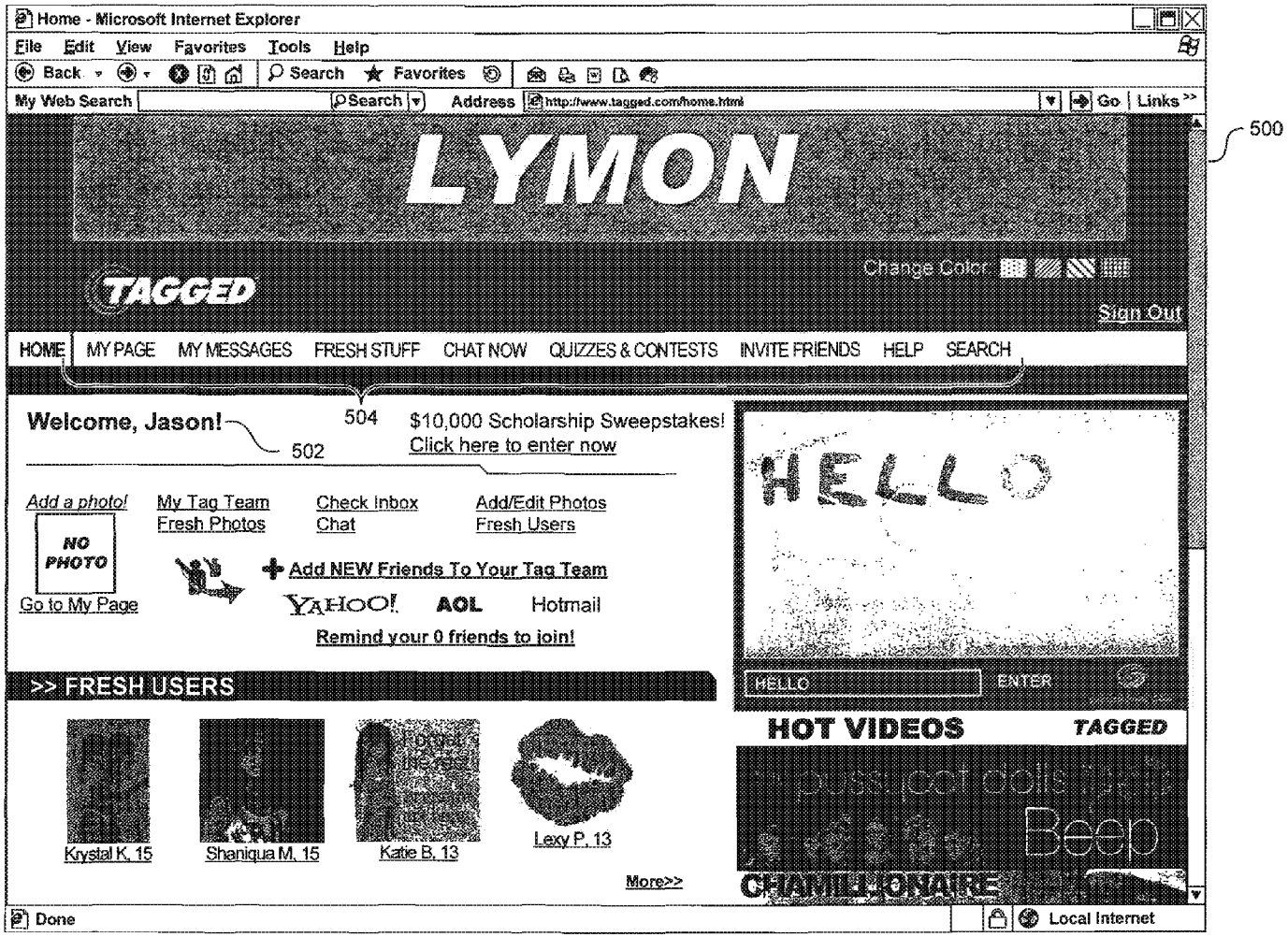
FIG. 5 is a representative GUI after a registered user has logged in to provide a starting point to utilize the social networking website's featured functions.

FIG. 5 is a representative GUI 500 of the online social networking website, after a registered user 502 has logged in. GUI 500 provides a starting point to utilize the social networking website's featured functions, including the menu bar 504. The user 502 can, for example, Invite Friends, Search registered users to socialize with, or get involved other social activities (chat, quizzes, contests, etc).

Figure 6:
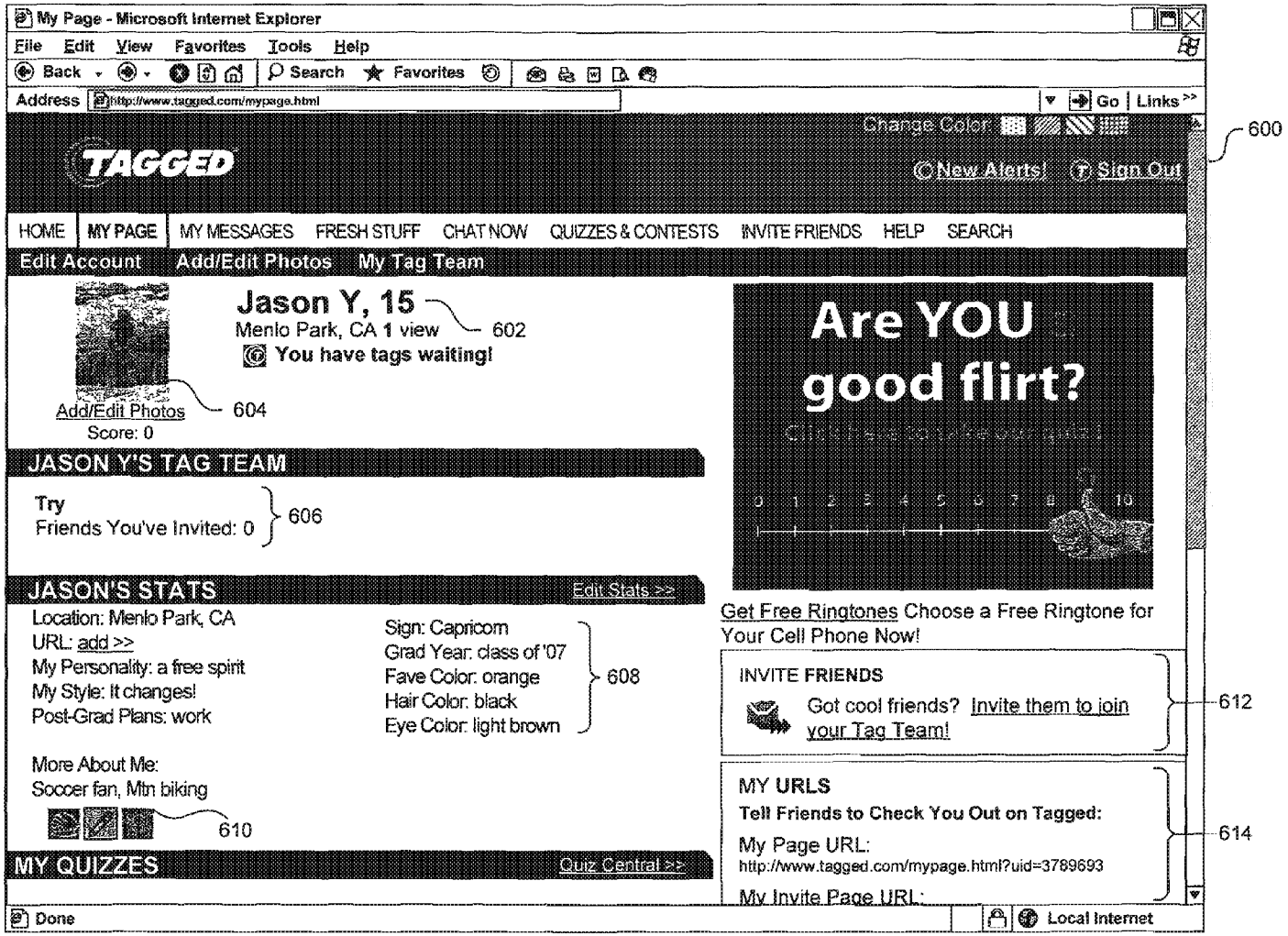
FIG. 6 is a representative GUI of a registered user's profile page, which enables the user to work with tags, invite friends, create teams, and other social networking tasks.

FIG. 6 illustrates a GUI 600 provided to a user 602. The social networking GUI 600 is a representative of a user's profile page that enables the user 602 to work with tags, invite friends, create teams, and accomplish other social networking tasks as will be appreciated by those skilled in the art. The GUI 600 includes a statistics window 604 that allows the user to review and edit personal statistics. The GUI 600 may also include the user's photos 606. The tag 606 represents personal characteristics and preferences. The GUI 600 further includes a tag team window 608, a 'friends' management window 610, and a URL management window 612. The personal profile page GUI 600 may be customized to show personal style, and also traded or sponsored in the social networking environment.

Figure 7:
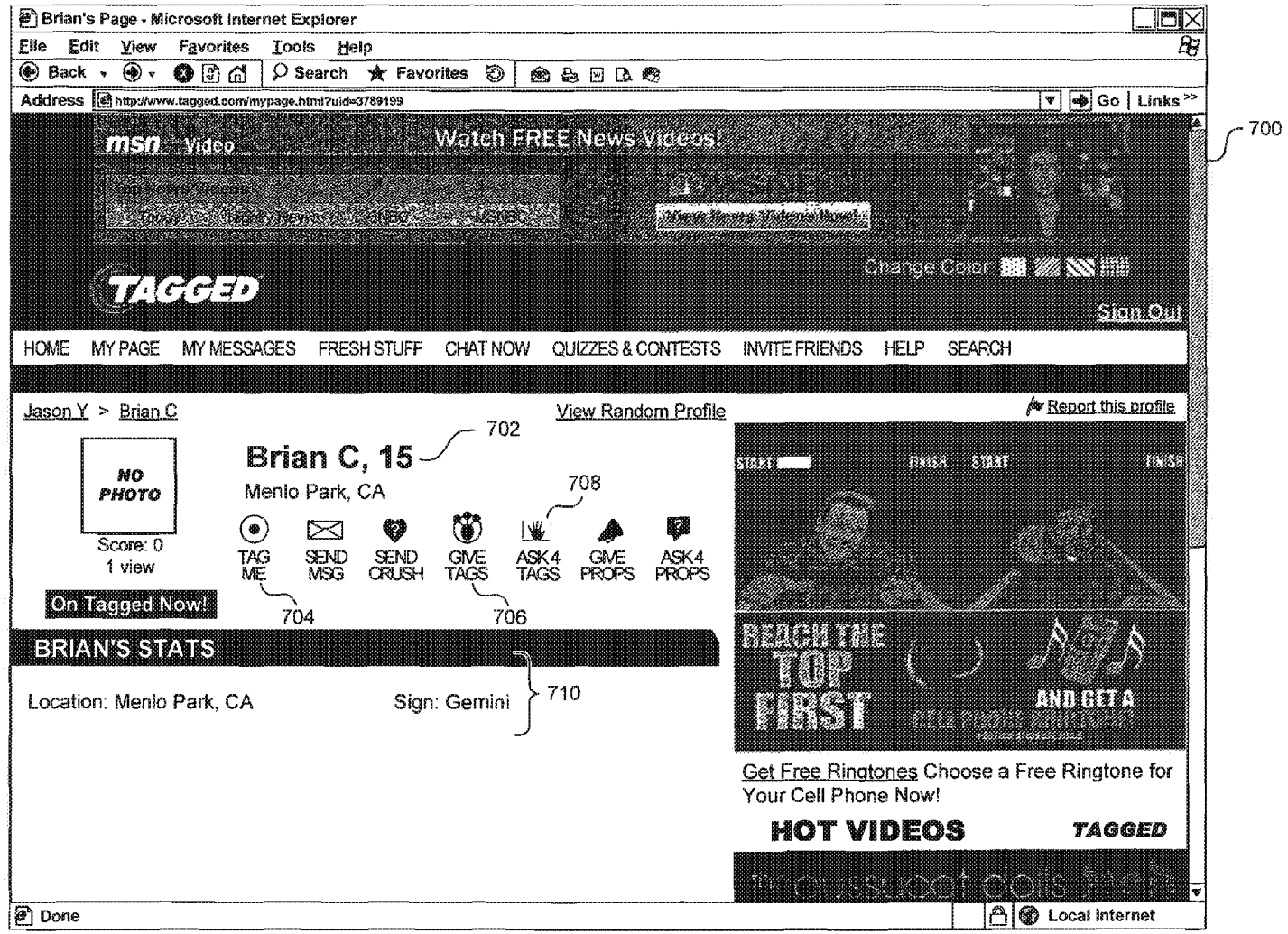
FIG. 7 is a representative GUI of another registered user's page where a user can invite to his team and send or request tags.

FIG. 7 is a representative GUI 700 of another registered user's page that can be reached by searching the registered user data base and choosing the person's page. A user can invite the person 702 to his team by tagging him 704, give tags 706, or ask for tags 708. The page also shows the person's statistics 710.

Figure 8:
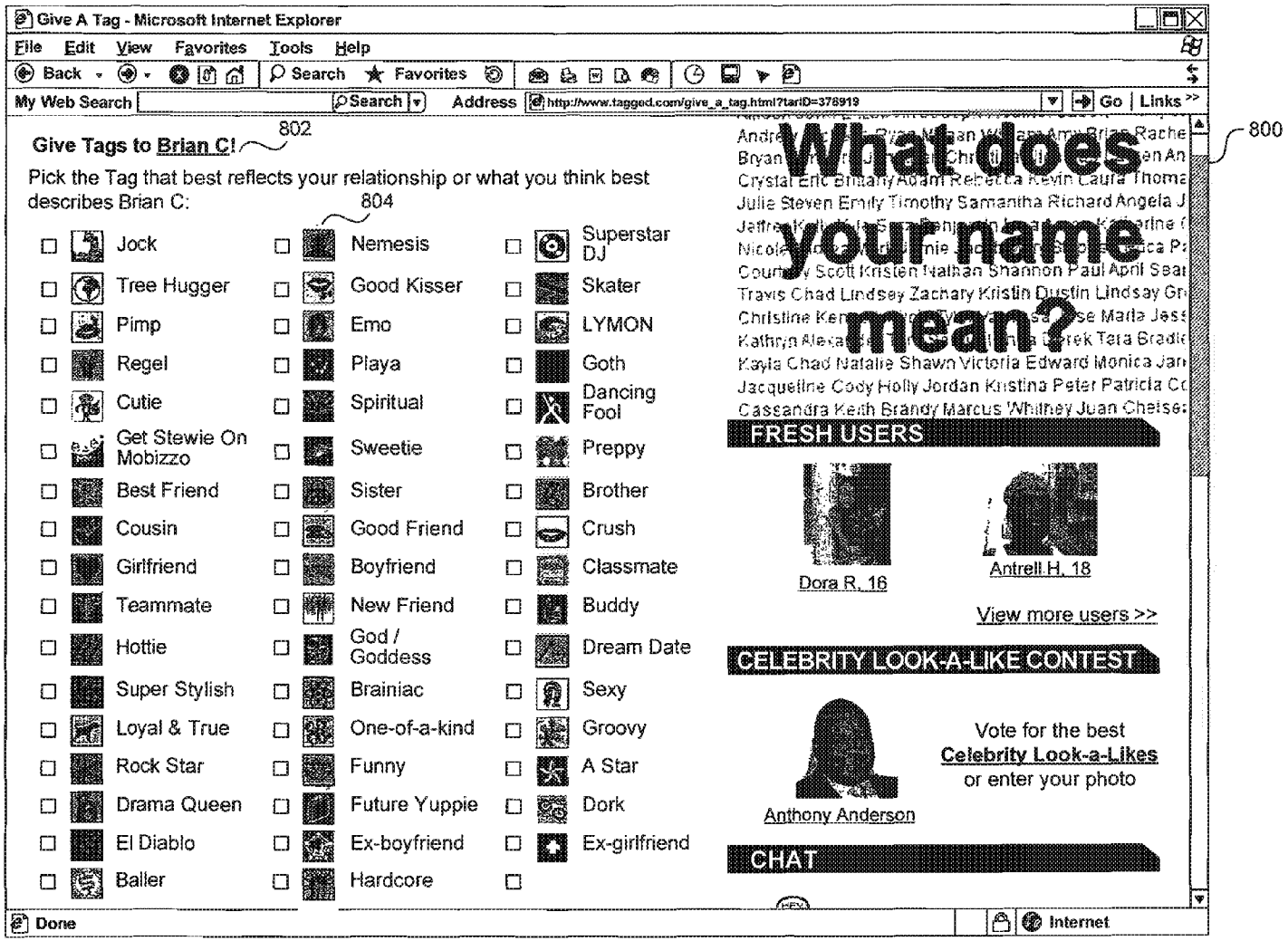
FIG. 8 is a representative GUI displaying predefined tags available to send to another registered user.

FIG. 8 is a representative GUI 800 displaying predefined tags 804 available to send to another registered user 802. The person sending tags can select as many tags as wished from the available tags 804 that best reflect the relationship or what the sender think best describes the recipient.

Figure 9:
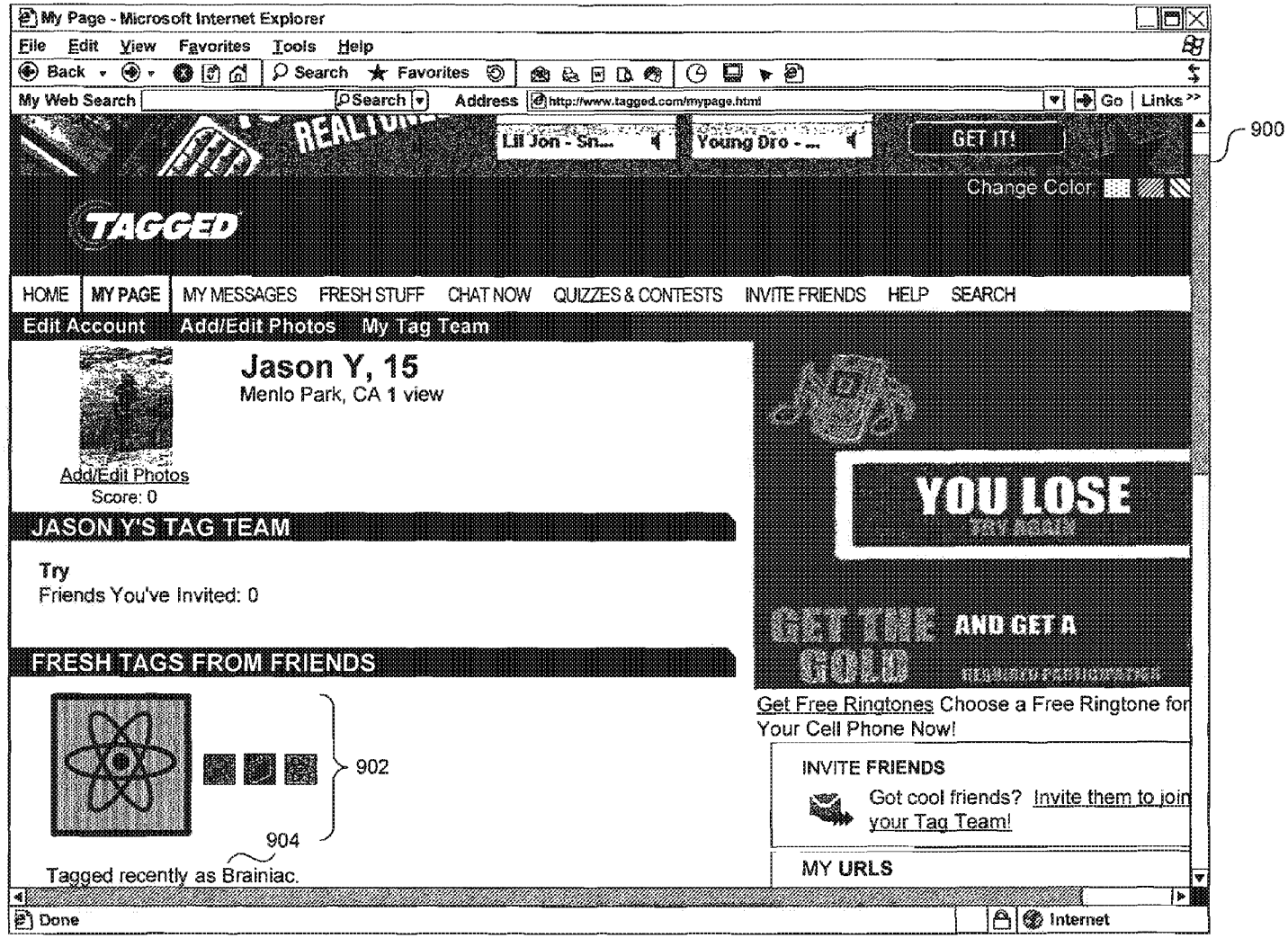
FIG. 9 is a representative GUI showing a registered user's "My Page" with tags received from another user.

FIG. 9 illustrates a representative GUI 900 showing a registered user's page after the user received tags 902 from another user 904.

Figure 10:
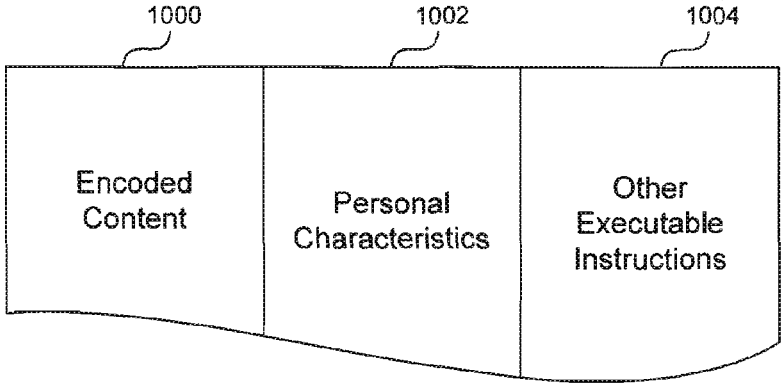
FIG. 10 is a representative structure of an embeddable tag.

FIG. 10 is the representative structure of embeddable tag, including encoded content 1000, personal characteristics 1002, and other executable instructions 1004.

Figure 11:
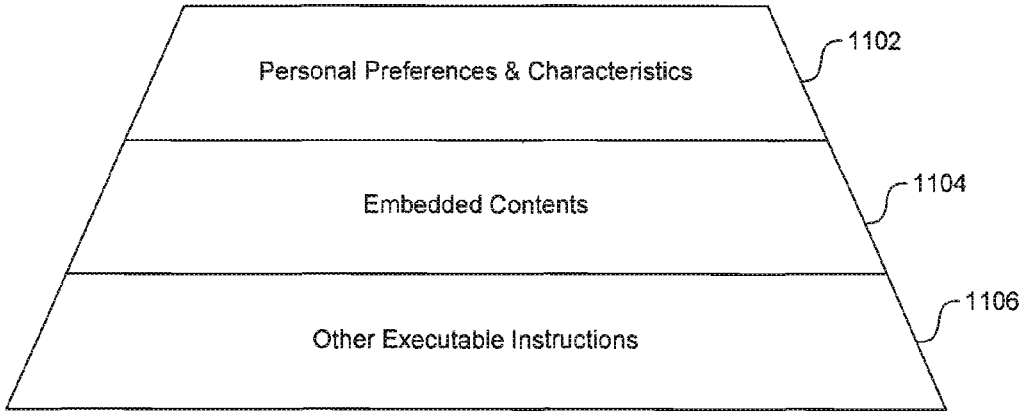
FIG. 11 is a representative structure of an embedded tag.

FIG. 11 shows a representative embedded tag structure 1100. An embedded tag represents personal preferences and characteristics 1102 e.g. by texts, a graphical icon, etc. Also, a tag can have embedded contents 1104, e.g. a photo, a song, a location of a profile page, a shout out, an expression of feelings, tags, or presents, etc. Other executable instructions 1106, e.g. to see the photo, play the song, go to the profile page, play a movie, or chat, etc. can be carried by a tag. A tag may be customized, traded, or sponsored in the social networking environment.

Figure 12:
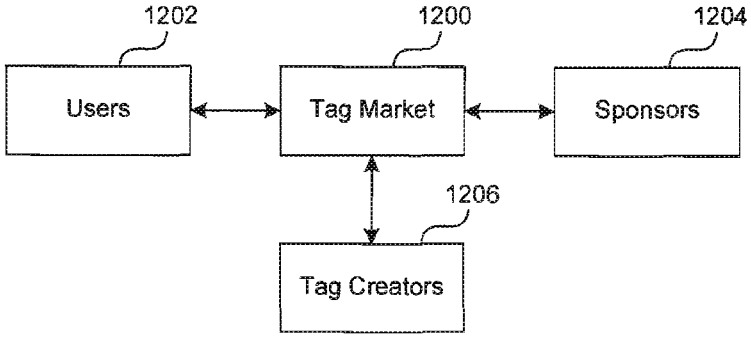
FIG. 12 is a representative interaction diagram for a tag market.

FIG. 12 illustrates the representative interaction of a tag market 1200. The users of the online social networking website 1202, creators of customized tags 1206, and sponsors 1204 interact in the tag market 1200 to buy, sell, or exchange tags.

The algorithms and software presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from other portions of this description. In addition, the present invention is not described with reference to any particular programming language, and various embodiments may thus be implemented using a variety of programming languages.

The techniques introduced above can be implemented by using programmable circuitry programmed by software and/or firmware, or by using special-purpose hardwired circuity, or by using a combination of such embodiments. Special-purpose hardwired circuitry may be in the form of, for example, one or more application-specific integrated circuits (ASICs), programmable logic devices (PLDs), field-programmable gate arrays (FPGAs), etc. The systems corresponding to the methods explained above may be specially constructed for the required purposes, or it may comprise a general purpose computer selectively activated or reconfigured by a computer program stored in the computer.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

It is claimed:

1. A social networking method comprising:

establishing an online networking environment to enable a plurality of users to engage in a social networking game; and operating a user interface in the online networking environment to enable a first user of the social networking game to:

select a first tag to convey to a second user, the first tag [representing a trait of the second] *being customized by the first* user [as attributed by the first] *to be representative of personal characteristics of the second* user;

convey the first tag to the second user to enable the second user to add the first tag to the second user's tag collection;

wherein the first tag is displayed in a profile page associated with the second user subsequent to the second user accepting the first tag conveyed by the first user*;* wherein the first user selects the first tag from *at least one of a first tag respiratory and* a second tag repository, wherein the second tag repository includes a plurality of tags maintained by an operator of the online networking environment.

2. The social networking method of claim 1, further comprising:

establishing a profile page for each user of the social networking game, the profile page enabling each user to display tags received from other users of the social networking game.

3. The social networking method of claim 1, wherein the [first user selects the first tag from a first tag repository, wherein the] first tag repository includes a plurality of tags associated with the first user.

4. The social networking method of claim 3, wherein the first tag repository includes a first subplurality of tags, the first subplurality of tags including customized tags created by the first user.

5. The social networking method of claim 3, wherein the first tag repository includes a second subplurality of tags, the second subplurality of tags including tags conveyed to the first user by other users of the social networking game.

6. The social networking method of claim 1, wherein the second tag repository includes a first subplurality of tags including tags created by the operator of the online networking environment.

7. The social networking method of claim 1, wherein the second tag repository includes a second subplurality of tags including tags contributed by the plurality of users of the social networking game.

8. The social networking method of claim 1, wherein the second tag repository includes a third subplurality of tags including sponsored tags, each sponsored tag contributed by a specific sponsor for marketing a product and/or service.

9. The social networking method of claim 1, wherein the first user dynamically creates the first tag prior to selecting and conveying the first tag to the second user.

10. The social networking method of claim 1, further comprising:

operating a tag market in association with the social networking game, wherein the tag market enables the first user to sell a specific tag to one of:

a third user of the social networking game, enabling the third user to add the specific tag to a tag repository associated with the third user; or an operator of the online networking environment, enabling the operator to add the specific tag to a tag repository associated with the online networking environment.

11. The social networking method of claim 1, further comprising:

operating a tag market in association with the social networking game, wherein the tag market enables the first user to purchase a specific tag from one of:

a third user of the social networking game, enabling the first user to add the specific tag to a tag repository associated with the first user; or an operator of the online networking environment, enabling the first user to add the specific tag to a tag repository associated with the first user.

12. The social networking method of claim 11, wherein the first user conveys the purchased specific tag to a fourth user as a gifted tag.

13. The social networking method of claim 11, wherein the first user conveys the purchased specific tag to a fourth user as a traded tag in return for a particular tag stored in a tag repository associated with the fourth user.

14. The social networking method of claim 1, wherein the first tag includes one or more of:

a graphic image;

an animated graphic image;

an embedded audio media;

an embedded video media;

an embedded hyperlink; or an embedded executable application.

15. A computer network for a social networking environment, the computer network comprising:

a communication network; and a plurality of client devices connected to the communication network, each of the plurality of client devices offering a user interface to enable a plurality of users to engage in a social networking activity;

wherein, the user interface of a first client device enables a first user of the social networking activity to:

select a first tag to convey to a second user of the social networking activity, the first tag [representing a trait of] *being customized by* the [second] *first* user [as intended by the first] *to be representative of personal characteristics of the second* user, the first tag selected from a tag repository, wherein the tag repository includes a plurality of tags maintained by an operator of the social networking environment, which tag repository may include tags customized by the first user;

convey the first tag to the second user to enable the second user to add the first tag to the second user's tag collection; and wherein the first tag is displayed in a profile page associated with the second user subsequent to the second user accepting the first tag conveyed by the first user.

16. The computer network of claim 15, wherein the first user selects the first tag from a first tag repository associated with the first user, the first tag repository including one or more of:

a first subplurality of tags including customized tags created by the user;

a second subplurality of tags including tags received by the first user from other users of the social networking activity;

a third subplurality of tags including tags purchased by the first user from an operator of the social networking activity; or a fourth subplurality of tags including tags purchased by the first user from other users of the social networking activity.

17. The computer network of claim 15, wherein the first user selects the first tag from a second tag repository associated with an operator of the social networking activity, the second tag repository including one or more of:

a first subplurality of tags including tags created by the operator of the social networking activity;

a second subplurality of tags including tags created and contributed by marketing sponsors; or a third subplurality of tags including tags contributed by the users of the social networking activity.

18. The computer network of claim 15, wherein the first tag includes one or more of:

a graphic image;

an animated graphic image;

an embedded audio media;

an embedded video media;

an embedded hyperlink; or an embedded executable application.

19. A set of instructions embodied on a *non-transitory* computer readable medium, the instructions, when executed, causing a machine to perform a method, the method comprising:

establishing a social networking environment; and operating a user interface to provide access to the social networking environment to a plurality of users, the user interface enabling a first user of the social networking environment to:

select a first tag to convey to a second user of the social networking environment, the first tag [representing a trait of the second user as attributed by the first] *being customized by the first user to be representative of personal characteristics of the second* user;

convey the first tag to the second user to enable the second user to add the first tag to the second users tag collection;

wherein the first tag is displayed in a profile page associated with the second user subsequent to the second user accepting the first tag conveyed by the first user; and wherein the first user selects the first tag from a second tag repository, wherein the second tag repository includes a plurality of tags maintained by an operator of the social networking environment.

20. A social networking method comprising:

establishing an online networking environment to enable a plurality of users to engage in a social networking game;

operating a user interface in the online networking environment to enable a specific user of the social networking game to create a customized tag for deposition into a tag repository associated with the online networking environment; and storing the customized tag in the tag repository, wherein the saved customized tag is suitable for being conveyed by a first user of the online networking environment to a second user of the online networking environment, enabling the second user to display the customized tag in a tag collection associated with the second user, *wherein the customized tag is customized by the first user to be representative of personal characteristics of the second user*;

wherein the first user selects the customized tag from the tag repository for sending to the second user, wherein the tag repository includes a plurality of tags;

wherein the customized tag is displayed in a profile page associated with the second user subsequent to the second user accepting the first tag conveyed by the first user.

21. The social networking method of claim 20, further comprising:

verifying the customized tag deposited by the specific user for propriety prior to saving the customized tag in the tag repository.

22. The social networking method of claim 20, wherein the tag repository is a personal database linked to the specific user.

23. The social networking method of claim 20, wherein the tag repository is a database linked to an operator of the social networking game.

24. The social networking method of claim 20, wherein the specific user conveys the customized tag to a third user subsequent to the customized tag being saved into the tag repository.

25. The social networking method of claim 20, wherein the customized tag is indicative of a message as intended by the first user to convey to the second user.

26. The social networking method of claim 20, wherein the user interface accepts the customized tag by allowing the specific user to upload the customized tag from a local computer associated with the specific user.

27. The social networking method of claim 20, wherein the user interface accepts the customized tag by allowing the specific user to create the customized tag in a digital studio offered by the user interface.

28. The social networking method of claim 19, wherein the customized tag includes one or more of:

[a] graphic content;

[a] textual content;

[a] multimedia content; or an animation content.

29. The social networking method of claim 20, wherein the specific user receives a credit from an operator of the social networking game in return for the deposition of the customized tag.

30. The social networking method of claim 29, wherein the credit includes one or more of:

a monetary compensation;

a gift token for use toward purchasing a particular tag from the tag repository; or a rating associated with the specific user's use of the social networking game.

31. The social networking method of claim 20, wherein the tag repository includes a plurality of categories for classifying tags stored in the tag repository.

32. The social networking method of claim 31, further comprising:

querying the specific user for a category to classify the customized tag under;

verifying a propriety of the category suggested by the specific user;

storing the customized tag in association with the suggested category subsequent to verifying the propriety of the suggested category.

33. The social networking method of claim 32, wherein the suggested category preexists in the plurality of categories.

34. The social networking method of claim 32, wherein the suggested category is a new category, further wherein the new category is included in the plurality of categories subsequent to the verification of the propriety of the new category.

* * * * *